United States Patent [19]

Coran et al.

[11] 4,203,884

[45] May 20, 1980

[54] THERMOPLASTIC COMPOSITIONS OF POLYNORBORNENE AND POLYOLEFIN RESIN

[75] Inventors: Aubert Y. Coran; Raman Patel, both of Akron, Ohio

[73] Assignee: Monsanto Company, St. Louis, Mo.

[21] Appl. No.: 31,576

[22] Filed: Apr. 19, 1979

[51] Int. Cl.$^2$ .................. C08L 23/06; C08L 23/12
[52] U.S. Cl. .................. 260/33.6 AQ; 260/33.6 PQ; 260/23 H; 260/42.39; 260/42.46; 525/210; 525/197
[58] Field of Search ........................................ 260/897

[56] References Cited

U.S. PATENT DOCUMENTS

| | | | |
|---|---|---|---|
| 3,676,390 | 7/1972 | Vergne et al. | 260/31.8 HR |
| 3,789,042 | 1/1974 | Colomb et al. | 260/17.4 CL |
| 3,862,106 | 1/1975 | Fischer | 260/80.78 |
| 4,104,210 | 8/1978 | Coran et al. | 260/4 R |

*Primary Examiner*—Carman J. Seccuro
*Attorney, Agent, or Firm*—Larry R. Swaney

[57] ABSTRACT

Thermoplastic compositions are described comprising blends of polynorbornene, plasticizer and crystalline thermoplastic polyolefin resin. Compositions in which the rubber is cross-linked are also described.

36 Claims, No Drawings

THERMOPLASTIC COMPOSITIONS OF POLYNORBORNENE AND POLYOLEFIN RESIN

This invention relates to thermoplastic compositions and, more particularly, to thermoplastic compositions comprising blends of polyolefin resin and polynorbornene.

BACKGROUND OF THE INVENTION

High molecular weight polymers are generally incompatible with each other. When two different polymers are mixed, the blend exhibits poor mechanical properties, e.g., tensile strength or ultimate elongation. A pair of polymers is seldom sufficiently compatible to give a blend exhibiting mechanical properties as good as the weakest polymer. However, when two polymers are compatible the resulting blend can exhibit a valuable combination of properties, i.e., in addition to good mechanical properties, the blends may also exhibit favorable characteristics, such as temperature and solvent resistance of the individual polymers.

SUMMARY OF THE INVENTION

It has been discovered that compositions, comprising blends of thermoplastic crystalline polyolefin resin, polynorbornene, and sufficient polynorbornene plasticizer to lower the glass transition temperature (Tg) of the polynorbornene to within the rubbery range exhibit improved properties. Generally, compositions comprising 1–99 parts by weight of crystalline polyolefin resin and correspondingly 99–1 parts weight of polynorbornene per 100 total parts by weight of resin and polynorbornene and enough plasticizer to reduce the Tg to below 10° C., typically between 30–400 parts by weight of polynorbornene plasticizer per 100 parts by weight of polynorbornene, are moldable thermoplastic compositions exhibiting improved strength, greater toughness or impact resistance. Compositions comprising more than 80 parts by weight of crystalline polyolefin resin per 100 parts by weight of polyolefin resin and polynorbornene combined are thermoplastic compositions exhibiting improved impact resistance. Compositions comprising less than 80 parts by weight of crystalline polyolefin resin are elastoplastic, i.e., they exhibit elastomeric properties yet are processable as thermoplastics.

Preferred compositions of the invention comprise a blend of about 75 to 10 parts by weight of polyolefin resin, about 25 to 90 parts by weight of polynorbornene and sufficient plasticizer for the polynorbornene to make it rubbery at room temperature or below. Preferred amounts of plasticizer are generally between about 50–200 parts by weight of plasticizer per 100 parts by weight of polynorbornene. Most preferred elastomeric compositions comprise blends of about 20 to about 60 parts by weight of polyolefin resin and about 80 to about 40 parts by weight of polynorbornene per 100 parts by weight of crystalline polyolefin resin and polynorbornene combined. In the molten state, a portion of the polynorbornene plasticizer can be part of the thermoplastic molten polyolefin phase, said polyolefin normally being crystalline at room temperature. After cooling, the plasticizer will be substantially removed from the crystalline polyolefin phase to become a part of the polynorbornene phase. Thus, because of the plasticizer, the relative volume of the molten polyolefin phase can be much larger than the relative volume of the crystalline polyolefin phase. Hence, the plasticizer can improve fabricability or thermoplasticity of the composition. Also, the amount of plasticizer affects thermoplasticity. Less of the normally crystalline polyolefin may be required for thermoplasticity when larger amounts of plasticizer are used.

One embodiment of the invention consists of compositions comprising about 10–90 parts by weight of crystalline polyolefin resin and correspondingly about 90–10 parts by weight of cross-linked polynorbornene in the form of small particles (below about 50 microns number average) per 100 total parts by weight of polyolefin resin and polynorbornene, and plasticizer wherein the cross-linked polynorbornene is dispersed throughout the polyolefin resin as discrete particles. The size of the cross-linked plasticized polynorbornene particles is generally 50 microns number average or below and preferably is below 10 microns number average and more preferably between 0.1–2 microns number average. The particle size may be readily determined by diluting the cross-linked particles in a transparent matrix media and measuring and counting the particles under a microscope.

An improved balance of properties is obtained by cross-linking the polynorbornene. Cross-linking the polynorbornene increases the tensile strength of the composition. Substantially greater increases in tensile strength are obtained in compositions in which the polynorbornene/polyolefin resin ratio is greater than one. In addition, cross-linking improves the solvent resistance and the high temperature properties of the blend. The properties of the composition improve as the extent of cross-linking of the polynorbornene increases. In preferred compositions, the polynorbornene is cross-linked to the extent that no more than 20 weight percent, preferably no more than 10 weight percent, and more preferably no more than 5 weight percent of the polynorbornene is extractable in a solvent in which the noncross-linked polynorbornene is essentially completely soluble. A preferred solvent for determining the extent of cross-linking is a solvent in which the polyolefin resin is soluble so that the polynorbornene is completely exposed to the solvent, for example, boiling xylene. However, the polynorbornene should not be too highly cross-linked, i.e., the cross-link density should not be so high so as to reduce the elasticity to the extent that it is no longer rubbery. Likewise, extensive cross-linking of the polyolefin resin should be avoided so that thermoplasticity of the composition is maintained. However, it should not be assumed that the curative does not react with the polyolefin resin or that there is no reaction between the polyolefin resin and polynorbornene. There may be highly significant reactions involved but of limited extent. However, the fact that a large proportion of the polyolefin resin can be dissolved by extraction with a solvent for the polyolefin resin such as boiling xylene indicates that no extensive cross-linking of the polyolefin resin has occurred.

Another embodiment of the invention which consists of a thermoset composition comprising a blend of polyolefin, plasticizer, and cross-linked polynorbornene in the form of a continous network rather than being in particulate form. Thermoset compositions of the invention are prepared by first blending polyolefin resin, polynorbornene and plasticizer at a temperature sufficient to melt the polyolefin resin using a conventional masticating equipment. The composition is then transferred to a mill where curvatives are incorporated therein at a temperature below the activation temperature of the curative system. The curable composition is then sheeted by passage through a roll mill or a shaped specimen is prepared. The sheet or shaped specimen is then cured by conventional means, typically by heating under pressure. The specimens may be cured either above or below the melting point of the polyolefin resin. When a specimen is cured below the melting point of the polyolefin resin, the physical properties of the cured specimen are dependent upon the direction of measurement because of orientation of resin particles. The degree of anistropy of any particular specimen depends upon the proportions of resin in the blend and the degree of orientation. Orientation of the resin particles can be conveniently achieved by passing a sheeted material one or more times through the rolls of an even speed mill.

Thermoplastic compositions of the invention in which the polynorbornene is cross-linked are preferably prepared by dynamic vulcanization, a process which comprises blending a mixture of polynorbornene, plasticizer, polyolefin resin and curvatives in amounts sufficient to cross-link the polynorbornene, then masticating the blend at a temperature sufficient to effect cross-link formation, using conventional masticating equipment, for example, a Banbury mixer, a Brabender mixer, or a mixing extruder. An intimate mixture of polyolefin resin, polynorbornene, and polynorbornene plasticizer are mixed at a temperature sufficient to melt the polyolefin resin. After the polyolefin resin is melted, curative is added. Heating and masticating at vulcanization temperatures are generally adequate to complete the crosslink formation in a few minutes or less, but if shorter times are desired, higher temperatures may be used. A suitable range of temperatures for cross-link formation is from about the melting temperature of the polyolefin resin to the decomposition temperature of the polynorbornene which range commonly is from about 110° C. to 250° C. Typically, the range is from about 130° C. to 220° C. A preferred range of temperatures is from about 140° C. to about 210° C. Blends are treated with curvatives in amounts and under time and temperature conditions known to give cured products of plasticized polynorbornene alone. This can be determined from studies of static cures of polynorbornene in molds, in the absence of polyolefin resin. Thermosets are avoided in the compositions of the invention by simultaneously masticating and curing the blends. To obtain thermoplastic compositions, it may be important that mixing continues without interruption until cross-linking occurs. Sometimes, when appreciable crosslinking is allowed after mixing has stopped, a thermoset unprocessable composition may be obtained. However, this material may be converted to a thermoplastic by cold milling or by remixing in a mixer until the cross-linked polynorbornene is reduced to a particle size of 50 microns or below. A few simple experiments within the skill of the art utilizing available curative systems will suffice to determine their applicability for the preparation of the improved products of this invention.

Methods other than the dynamic vulcanization can be utilized to prepare compositions of the invention. For example, plasticized polynorbornene can be fully vulcanized in the absence of the polyolefin resin, comminuted, and mixed with the polyolefin resin at a temperature above the melting or softening point of the polyolefin resin. Provided that the cross-linked polynorbornene particles are small, well dispersed and in an appropriate concentration, compositions within the invention are easily obtained by blending cross-linked polynorbornene and polyolefin resin. In addition, thermoplastic compositions may be prepared by masticating a blend of polyolefin resin and plasticized polynorbornene, incorporating curvatives and then curing under static conditions, such as, in a mold.

Thermoplastic compositions of the invention are all processable in an internal mixer, to products which, upon transferring at temperatures above the softening or crystallizing points of the polyolefin resin, to the rotating rolls of a rubber mill, from continuous sheets. The sheets are reprocessable in the internal mixer, after reaching temperatures above the softening or melting points of the polyolefin resin. The material is again transformed to the plastic state (molten state of the polyolefin resin) but upon passing the molten product through the rolls of the rubber mill a continuous sheet again forms. In addition, a sheet of thermoplastic composition of this invention can be cut into pieces and compression molded to give a single smooth sheet with complete knitting or fusion between the pieces. It is in the foregoing sense that "thermoplastic" will be herein understood. In addition, elastoplastic compositions of the invention are further processable to the extent that articles may be formed therefrom by extrusion, injection molding or calendering.

Polynorbornenes satisfactory for the practice of the invention are substantially amorphous polymers or copolymers of bicyclo [2.2.1] heptene-2 and its substituted derivatives as described in U.S. Pat. No. 3,676,390 issued July 11, 1972, the disclosure of which is incorporated herein by reference. Polynorbornene may be prepared as described in the reference patent. As indicated in the reference patent, it is necessary to use a low volatily liquid material in combination with the polynorbornene in order to convert the polynorbornene into its rubbery form. For convenience, materials which lower the glass transition temperature of polynorbornene to within the rubbery range are called plasticizers, more precisely polynorbornene plasticizers. Those substances described in the reference patent, Col. 2, lines 45-60 are satisfactory for the practice of this invention. Hydrocarbon oils typically used in rubber compounding and referred to as extender oils are suitable for the practice of this invention.

Any curing system suitable for vulcanizing diene rubber is suitable for cross-linking polynorbornene and may be used in the practice of this invention. Satisfactory rubber curvatives are based on sulfur-, peroxide, azide, maleimido, quinoid, urethane, or phenolic resin vulcanization agents, ordinarily used in conjunction with vulcanization activators or accelerators. Examples of satisfactory curing system components are zinc oxide, sulfur, organic peroxide, magnesium oxide, benzothiazole sulfenamide accelerator, benzothiazyl disulfide, phenolic (phenol/formaldehyde) curing resin, stannous chloride, m-phenylene bis-maleimide, benzoquinone dioxime, thiuram disulfide, lead peroxide and dipentamethylene thiuram hexasulfide. Efficient or semi-efficient sulfur curing systems comprising high accelerator to sulfur ratios are especially preferred. Sufficient quantities of curvatives are used to cross-link the polynorbornene to the extent necessary to achieve the desired extent of cure. High energy radiation is also utilizable as the curative means. Large amounts of organic peroxides should be avoided with branched polyolefin resins (e.g. polypropylene) and coagents should be used.

Suitable thermoplastic polyolefin resins comprise crystalline, high molecular weight solid products from the polymerization of one or more monoolefins by either high pressure or low pressure processes. Examples of such resins are the isotactic and syndiotactic monoolefin polymer resins, representative members of which are commercially available. Examples of satisfactory olefins are ethylene, propylene, 1-butene, 1-pentene, 1-hexene, 2-methyl-1-propene, 3-methyl-1-pentene, 4-methyl-1-pentene, 5-methyl-1-hexene and mixtures thereof. Commercially available thermoplastic polyolefin resins (or blends thereof), and preferably polyethylene or polypropylene, may be advantageously used in the practice of the invention with polypropylene being preferred.

The properties of the compositions of this invention may be modified by addition of ingredients which are conventional in the compounding of rubber, polyolefin resin and blends thereof. Additions can be before or after vulcanization. Examples of such ingredients include carbon black, silica, titanium dioxide, magnesia, colored pigments, clay, silanes, titanates or other coupling agents, stabilizers, antidegradants, processing aids, adhesives, tackifiers, wax, and discontinuous fibers such as wood cellulose or glass fibers, etc. The addition of particulate filler, preferably prior to dynamic vulcanization, is particularly recommended. Preferably, the particulate filler and plasticizer are masterbatched with the polynorbornene and the masterbatch is then mixed with the polyolefin resin. Particulate fillers such as carbon black or silane-treated clay, improve the tensile strength. Clay also can improve the ultimate elongation of the elastoplastic composition. Typical additions of particulate fillers or reinforcement fillers such as carbon black comprise about 20–150 parts by weight of filler per 100 parts by weight of polynorbornene and usually about 10–100 parts by weight filler per 100 parts total weight of polynorbornene and plasticizer. The amount of particulate filler which can be used depends, at least in part, upon the type of filler and the amount of plasticizer to be used.

Thermoplastic compositions of the invention are useful for making a variety of articles such as tires, hoses, belts, gaskets, moldings and molded parts. They are particularly useful for making articles by extrusion, injection molding and compression molding techniques. Compositions of the invention also are useful for blending with thermoplastics in particular, polyolefin resin. The compositions of the invention are blended with thermoplastics using conventional mixing equipment. The properties of the blend depend upon the proportions. Generally, the amount is such that the blend contains sufficient cross-linked polynorbornene to obtain the desired effect.

Tensile properties of the compositions are determined by ASTM procedure D-1708-66. Specimens are pulled with an Instron tester at one inch per minute up to 30% elongation and then 10 inches per minute to failure. The term "elastomeric" as used herein and in the claims means a composition which possess the property of forcibly retracting within ten minutes to less than 160% of its original length after being stretched at room temperature to twice its unstressed length and held for ten minutes before release. Especially preferred compositions of the invention are rubbery compositions having tension set values of about 50% or less which compositions approximate the definition for rubber as defined by ASTM Standards, V. 28, page 756 (D1566). More preferred compositions are compositions having a Shore D hardness of 50 or below or a 100% modulus between 3–15 MPa (megapascals) or a Young's modulus below 100 MPa.

DESCRIPTION OF THE PREFERRED EMBODIMENTS

When the dynamic vulcanization process is used, it is important that the polyolefin resin and plasticized polynorbornene are intimately mixed prior to vulcanization. A technique for assuring a homogenous polymer blend comprises first masticating the polymers at a temperature above the melting temperature of the polyolefin resin, next masticating the mixture at a temperature below the melting temperature of the polyolefin resin, and lastly masticating the mixture at a temperature above the melting temperature of the polyolefin resin. The aforesaid procedure gives a homogenous blend of polyolefin resin and polynorbornene in the form of well-dispersed small particles of fairly uniform size. Curatives are then added and mastication is continued until the plasticized polynorbornene is cross-linked.

Compositions of the invention are illustrated in Tables 1–7. Unless indicated otherwise, the compositions are prepared as follows: A masterbatch comprising in the indicated proportions polynorbornene, particulate filler (carbon black or clay), polynorbornene plasticizer (hydrocarbon extender oil), zinc oxide and stearic acid is first prepared by conventional means. The masterbatch and polyolefin resin are charged to a Brabender mixer at 180° C. and a mixing speed of 100 rpm. Mastication is continued for about 5 minutes after the polyolefin resin is melted. The mixture is removed from the mixer and milled for about one minute on a roll mill at a temperature below the crystallization temperature of the resin. The mixture is then returned to the Brabender mixer and again melt mixed giving a homogenous thermoplastic blend. In the case of blends containing cross-linked polynorbornene, curatives are added at this time and mastication is continued until the polynorbornene is cross-linked (about 4 minutes). In the case of sulfur curative systems, the sulfur is added about ½ minute after the accelerators. The composition is removed, sheeted on a mill, and then remixed in the Brabender mixer at 180° C. for 2 minutes. Test specimens are prepared by compression molding at 220° C. and then evaluated.

The effect of varying the proportions of polynorbornene and polypropylene is shown in Table 1. The polynorbornene is purchased under the tradename Norsorex. It is a polymer of bicyclo [2.2.1] heptene-2 having a molecular weight over 2,000,000, compounded density of 0.96 g/cm$^3$, and a softening point about +35° C. in the absence of plasticizer. The polypropylene is a low flow, general purpose polypropylene specific gravity 0.902 and 11% yield elongation. The extender oil is purchased under the tradename Sunthene 4240 and is a naphthenic extender oil. The relative (to polynorbornene) proportions of extender oil and carbon black are kept constant. The amounts are 150 parts by weight extender oil and 100 parts by weight carbon black per 100 parts by weight of polynorbornene. The data in parenthesis are for compositions without curative.

The data show that hardness, tensile strength, 100% modulus, and Young's modulus E, increase with increasing proportions of polypropylene. The data show that cross-linking the polynorbornene results in substantial increases in tensile strength and 100% modulus and improves tension set. The improvement in tensile strength due to cross-linking is greater in compositions comprising 50 parts by weight or more polynorbornene per 100 total parts by weight of polypropylene and polynorbornene. Cross-linking reduces ultimate elongation except in compositions containing 80 parts by weight or more of polypropylene which compositions exhibit a yield point. All compositions are processable as thermoplastics.

Compositions of the invention comprising polyethylene, polybutene-1 and mixtures of polyolefin resins are illustrated in Table 2. The polyethylene is ASTM D-1248-72, Type IV, having a melt index 0.6 and density of 0.960 g/cm$^3$. The polybutene is purchased under the tradename Witron 1200.

TABLE 1

| Stock (parts by weight) | 1 | 2 | 3 | 4 | 5 | 6 | 7 | 8 | 9 | 10 |
|---|---|---|---|---|---|---|---|---|---|---|
| Polynorbornene | 90 | 85 | 80 | 70 | 60 | 50 | 40 | 30 | 20 | 10 |
| Polypropylene | 10 | 15 | 20 | 30 | 40 | 50 | 60 | 70 | 80 | 90 |
| Extender oil | 135 | 127.5 | 120 | 105 | 90 | 75 | 60 | 45 | 30 | 15 |
| Carbon black | 90 | 85 | 80 | 70 | 60 | 50 | 40 | 30 | 20 | 10 |
| Sulfur curative* | 6.75 | 7.0 | 7.2 | 7.3 | 6.3 | 5.25 | 4.2 | 3.15 | 2.1 | 1.05 |
| Properties | | | | | | | | | | |
| Hardness, Shore D | — | — | — | — | — | 37 | 42 | 50 | 56 | 63 |
| | — | — | — | — | — | (39) | (42) | (50) | (52) | (61) |
| Hardness, Shore A | 60 | 64 | 67 | 73 | 78 | 88 | — | — | — | — |
| | (56) | (56) | (60) | (76) | (80) | (85 | — | — | — | — |
| TS, MPa | 8.4 | 8.1 | 10.2 | 12.6 | 12.7 | 14.8 | 14.1 | 15.0 | 16.7 | 19.0 |
| | (3.5) | (3.9) | (4.3) | (6.3) | (6.8) | (7.8) | (9.6) | (12.3) | (14.3) | (16.4) |
| M$_{100}$, MPa | 1.3 | 1.5 | 2.3 | 4.5 | 5.3 | 8.3 | 10.7 | 13.7 | 16.5 | 18.2 |
| | (0.7) | (0.8) | (1.1) | (2.2) | (3.3) | (4.9) | (7.6) | (10.6) | (14.9) | (16.7) |
| E, MPa | 1.6 | 1.7 | 2.0 | 4.0 | 6.6 | 12.7 | 29.6 | 60 | 129 | 310 |
| | (1.5) | (1.6) | (2.2) | (4.4) | (7.0) | (14.8) | (29.9) | (61) | (134) | (266) |
| Ult. El., % | 330 | 310 | 280 | 230 | 240 | 200 | 180 | 150 | 170 | 390 |
| | (420) | (410) | (380) | (340) | (320) | (260) | (210) | (200) | (180) | (350) |
| Tension set, % | 15 | 14 | 11 | 14 | 20 | 24 | 33 | 44 | 51 | 57 |
| | (29) | (29) | (28) | (28) | (35) | (40) | (45) | (51) | (55) | (60) |
| True stress at break, MPa | 36 | 33 | 39 | 41 | 44 | 45 | 39 | 38 | 45 | 93 |
| | (18) | (20) | (21) | (28) | (28) | (28) | (30) | (36) | (40) | (74) |

*5 phr ZnO, 1 phr stearic acid and the remainder in phr comprising equal parts by weight of 4,4' dithiomorpholine, N-tert-butyl-2-bensothiazolesulfenamide, and sulfur. phr = parts by weight per hundred parts by weight polynorbornene.

TABLE 2

| Stock (parts by weight) | 1 | 2 | 3 | 4 | 5 | 6 | 7 |
|---|---|---|---|---|---|---|---|
| Polynorbornene* | 30 | 40 | 50 | 60 | 50 | 50 | 50 |
| Polyethylene | 70 | 60 | 50 | 40 | — | — | 20 |
| Polypropylene* | — | — | — | — | — | 30 | 30 |
| Polybutene-1 | — | — | — | — | 50 | 20 | — |
| Extender oil | 45 | 60 | 75 | 90 | 75 | 75 | 75 |
| Carbon black* | 30 | 40 | 50 | 60 | 50 | 50 | 50 |
| Sulfur curative* | 3.15 | 4.2 | 5.25 | 6.3 | 5.25 | 5.25 | 5.25 |
| Properties | | | | | | | |
| Ts, MPa | 13.1 | 12.6 | 11.7 | 13.1 | 6.5 | 14.2 | 10.2 |
| | (10.9) | (10.8) | (10.7) | (11.7) | (6.3) | | |
| M$_{100}$, MPa | 13.5 | 11.8 | 8.9 | 6.8 | 2.8 | 5.4 | 7.6 |
| | (10.0) | (8.1) | (6.1) | (4.2) | (2.4) | | |
| E, MPa | 91 | 56 | 27 | 11.8 | 4.9 | 8.6 | 11.1 |
| | (89) | (52) | (27) | (10.5) | (4.8) | | |
| Ult. El., % | 170 | 140 | 170 | 220 | 190 | 270 | 160 |
| | (270) | (280) | (330) | (400) | (280) | | |
| Tension set, % | 39 | 34 | 29 | 19 | 32 | 27 | 26 |
| | (55) | (47) | (42) | (30) | (47) | | |
| Hardness, Shore D | 42 | 40 | 35 | 32 | 25 | 30 | 32 |
| | (35) | (31) | (34) | (28) | (27) | | |
| True stress at break, MPa | 35 | 30 | 32 | 42 | 19 | 52 | 26 |
| | (40) | (41) | (46) | (58) | (24) | — | — |

*Same as in Table 1.

The data in parenthesis are for blends prepared in a similar manner but without curatives. The data indicates that the effect of varying the proportions of polyethylene and polynorbornene (stocks 1–4) are similar to those obtained with polypropylene but that the improvement in properties due to cross-linking is not as great. However, polyethylene gives better compositions than those obtained with polybutene-1. A comparison of compositions containing a mixture of two polyolefin resins (stocks 6 and 7) shows that compositions comprising polypropylene and polybutene-1 are superior to compositions comprising polyethylene and polypropylene. This is surprising since, when polybutene-1 is the sole polyolefin resin, a weaker composition is obtained with substantially less improvement due to cure.

The effect of extender oil is illustrated in Table 3. The odd numbered stock are controls containing no curative. A naphthenic extender oil (Circosol 4240) is used. The data show a substantial improvement in properties results from cross-linking the polynorbornene. All compositions are processable as thermoplastics. Stocks 1 and 2 indicate that 25 parts by weight extender oil per 100 parts by weight of polynorbornene are insufficient to lower the glass transition temperature of the polynorbornene to within the rubbery range but that with increasing amounts of extender oil the compositions become more rubbery.

A study of the effect of different extender oils is shown in Table 4. The data show that compositions containing aromatic or naphthenic extender oils are superior to composition containing paraffinic extender oil.

Compositions containing different particulate fillers are illustrated in Table 5. Silane A-172 (vinyl-tris-betamethoxy ethoxy silane) is a silane coupling agent for clays. The procedure for preparing the compositions is different than before. The step of mixing on a roll mill is omitted and the curatives are added to the Brabender mixer at 182° C. after a homogenous mixture is obtained as shown by a smooth uniform appearance of the blend. Otherwise the procedure is the same. The data indicates that the properties of the compositions are essentially the same except the composition containing kaolin clay (Dixie clay) has superior ultimate elongation.

TABLE 3

| Stock (all parts by weight) | 1 | 2 | 3 | 4 | 5 | 6 | 7 | 8 | 9 | 10 |
|---|---|---|---|---|---|---|---|---|---|---|
| Polynorbornene* | 60→ | → | → | → | → | → | → | → | → | → |
| Polypropylene* | 40→ | → | → | → | → | → | → | → | → | → |
| Carbon black* | 48→ | → | → | → | → | → | → | → | 60 | 60 |
| Sulfur curative* | — | 6.3 | — | 6.3 | — | 6.3 | — | 6.3 | — | 6.3 |
| Extender oil | 15 | 15 | 30 | 30 | 60 | 60 | 90 | 90 | 120 | 120 |
| Properties | | | | | | | | | | |
| TS, MPa | 15.8 | 25.5 | 16.6 | 23.0 | 5.7 | 18.7 | 2.3 | 11.1 | 3.2 | 10.7 |
| $M_{100}$, MPa | — | — | 13.8 | 20.9 | 5.1 | 10.8 | 2.2 | 7.5 | 2.8 | 6.1 |
| E, MPa | 147 | 455 | 34.3 | 47.5 | 10.3 | 13.6 | 4.7 | 8.5 | 5.1 | 6.1 |
| Ult. El., % | 34 | 36 | 180 | 130 | 190 | 180 | 250 | 150 | 230 | 170 |
| Tension set, % | — | — | 38 | 39 | 45 | 21 | 53 | 21 | 42 | 15 |
| Hardness, Shore A | — | — | 92 | 92 | 84 | 85 | 75 | 79 | 76 | 78 |

*Same as in Table 1

TABLE 4

| Stock (all parts by weight) | 1 | 2 | 3 | 4 | 5 | 6 |
|---|---|---|---|---|---|---|
| Polynorbornene* | 60→ | → | → | → | → | → |
| Polypropylene* | 40→ | → | → | → | → | → |
| Carbon Black* | 48→ | → | → | → | → | → |
| Aromatic extender oil Type 102 (Sundex 790) | 60 | 60 | — | — | — | — |
| Naphthenic extender oil Type 103 (Circosol 4240) | — | — | 60 | 60 | — | — |
| Paraffinic extender oil Type 104B (Sunpar 2280) | — | — | — | — | 60 | 60 |
| Sulfur curative* | — | 6.3 | — | 6.3 | — | 6.3 |
| Properties | | | | | | |
| TS, MPa | 11.7 | 19.9 | 5.7 | 18.7 | 4.7 | 9.8 |
| $M_{100}$, MPa | 6.6 | 8.7 | 5.1 | 10.8 | — | 9.8 |
| E, MPa | 14.0 | 13.6 | 10.3 | 13.6 | 11.3 | 11.3 |
| Ult. El., % | 300 | 290 | 190 | 180 | 90 | 100 |
| Tension set, % | 41 | 26 | 45 | 21 | — | — |
| Hardness, Shore A | 82 | 86 | 84 | 85 | 83 | 84 |

*Same as in Table 1

TABLE 5

| Stock (all parts by weight) | 1 | 2 | 3 |
|---|---|---|---|
| Polynorbornene* | 50 | 50 | 50 |
| Polypropylene* | 50 | 50 | 50 |
| Extender oil* | 75 | 75 | 75 |
| Carbon black N-550 | 50 | — | — |
| Carbon black N-330 | — | 50 | — |
| Dixie Clay | — | — | 50 |
| Zinc oxide | 2.5 | 2.5 | 2.5 |
| Stearic acid | 0.5 | 0.5 | 0.5 |
| Silane A-172 | — | — | 0.5 |
| N-cyclohexyl-2-benzo-thiazole sulfenamide | 2.5 | 2.5 | 2.5 |
| Sulfur | 0.75 | 0.75 | 0.75 |
| Properties | | | |
| Ts, MPa | 11.4 | 12.9 | 11.2 |
| $M_{100}$, MPa | 8.6 | 5.2 | 6.9 |
| E, MPa | 17.8 | 17.4 | 19.7 |
| Ult. El., % | 160 | 190 | 270 |
| Tension set, % | 27 | 28 | 25 |
| Hardness, Shore A | 88 | 88 | 87 |

*Same as in Table 1.

Compositions prepared with different curvatives are illustrated in Table 6. The preparation procedure is the same as in Table 5 for stocks 1-5 and the same as in Table 1 for stock 6. Santocure® accelerator is N-cyclohexyl-2-benzothiazolesulfenamide. Santocure® NS accelerator is N-tert-butyl-2-benzothiazole sulfenamide. Sulfasan® vulcanizing agent is 4—4' dithiodimorpholine. TMTD is tetramethylthiuram disulfide. TMTM is tetramethythiuram monosulfide. ZMDC is zinc dimethyldithiocarbamate. Novor 924 is an urethane type curvative. SP1056 is brominated dimethylol-p-octyl phenol resin. The data show that satisfactory thermoplastic elastomeric compositions are obtained with all of the curatives.

Compositions of the invention prepared by static curing are illustrated in Table 7. A masterbatch comprising in the indicated proportions polynorbornene, carbon black, extender oil, zinc oxide and stearic acid is prepared by conventional means. The masterbatch and polypropylene are charged to a Brabender mixer at 180° C. and a mixing speed of 100 rpm before the polypropylene melts and 60-80 rpm thereafter. Mastication is continued for about 5 minutes after the polypropylene is melted. The mixture is removed, cooled, milled for about one minute on a roll mill, then returned to the Brabender mixture and again melt mixed for about 5 minutes. The composition is then removed and cooled. A portion of the composition is compression molded at 220° C. which comprises stock 1. Stock 2 is prepared by incorporating curatives into another portion of the composition by milling on a cool roll mill. The vulcanizable composition thus prepared is then cured in a press at 200° C. for 10 minutes. The cured composition of Stock 2 is cut into small pieces and the pieces compression molded at 200° C. to obtain stock 3. The molding has knit lines, however, there is no cracking when the specimen is bent. The cured composition of Stock 2 is milled at 60° C. on a roll mill, then compression molded at 200° C. to obtan stock 4. A smooth molding is obtained. Stock 5 is obtained by mixing the cured composition of Stock 2 in a Brabender mixer at 180° C. for 5 minutes, removing, cooling and then compression molding the material at 200° C. The data show that stronger compositions are obtained by static curing and that the static cured product is processable as a thermoplastic. For purposes of comparison, Stock 6 of Table 1 represents a similar composition prepared by dynamic vulcanization. The comparison indicates that static cured compositions upon remolding have properties similar to the properties of dynamically cured compositions.

TABLE 6

| Stock (parts by weight) | 1 | 2 | 3 | 4 | 5 | 6 |
|---|---|---|---|---|---|---|
| Polynorbornene* | 50→ | → | → | → | → | → |
| Polypropylene* | 50→ | → | → | → | → | → |
| Carbon black* | 50→ | → | → | → | → | → |
| Naphthenic extender oil* | 75→ | → | → | → | → | → |
| Zinc Oxide | 2.5→ | → | → | → | → | 1.0 |
| Stearic acid | 0.5→ | → | → | → | → | → |
| Sulfur | — | 1 | 0.65 | 1 | — | — |
| Santocure® accelerator | — | 1.5 | 0.5 | — | — | — |
| Santocure® NS accelerator | — | — | — | 1.89 | — | — |
| Sulfasan® R vulcanizing agent | — | — | 0.5 | — | — | — |
| TMTD | — | — | — | 0.25 | — | — |
| TMTM | — | — | — | 0.39 | — | — |
| ZMDC | — | — | — | — | 1 | — |
| Novor® 924 cross-linker | — | — | — | — | 3.5 | — |
| SP-1056 | — | — | — | — | — | 5.0 |
| Properties |  |  |  |  |  |  |
| Ts, MPa | 7.4 | 13.4 | 11.8 | 11.8 | 11.9 | 17.0 |
| M$_{100}$, MPa | 5.1 | 8.6 | 8.1 | 9.6 | 10.7 | 10.6 |
| E, MPa | 17.0 | 19.0 | 18.0 | 18.1 | 20.4 | 13.7 |
| Ult. El., % | 270 | 210 | 190 | 150 | 120 | 170 |
| Tension set, % | 43 | 25 | 31 | 29 | 20 | 23 |

*Same as Table 1.

TABLE 7

| Stock (all parts by weight) | 1 | 2 | 3 | 4 | 5 |
|---|---|---|---|---|---|
| Polynorbornene* | 50 | 50 | cured composition of Stock 2 | | |
| Polypropylene* | 50 | 50 | | | |
| Carbon black* | 50 | 50 | | | |
| Extender oil* | 75 | 75 | | | |
| Zinc oxide | 2.5 | 2.5 | | | |
| Stearic acid | 0.5 | 0.5 | | | |
| Santocure® NS accelerator | — | 0.75 | | | |
| Sulfasan® vulcanizing agent | — | 0.75 | | | |
| Sulfur | — | 0.75 | | | |
| Properties |  |  |  |  |  |
| TS, MPa | 9.6 | 18.8 | 13.5 | 14.6 | 13.5 |
| M$_{100}$, MPa | 7.6 | 9.3 | 10.3 | 10.0 | 9.9 |
| E, MPa | 29.9 | 18.4 | 19.6 | 17.6 | 16.0 |
| Ult.El.,% | 210 | 250 | 150 | 180 | 170 |
| Tension set, % | 45 | 24 | 22 | 23 | 24 |

*Same as Table 1.

Although the invention has been illustrated by typical examples, it is not limited thereto. Changes and modifications of the examples of the invention herein chosen for purposes of disclosure can be made which do not constitute departure from the spirit and scope of the invention.

The embodiments of the invention in which an exclusive property or privilege is claimed are defined as follows:

1. A composition comprising a blend of about 1–99 parts by weight of thermoplastic crystalline polyolefin resin, about 99–1 parts by weight of polynorbornene per 100 total parts by weight of polyolefin resin and polynorbornene, and sufficient plasticizer to lower the glass transition temperature of the polynorbornene to within the rubbery range.

2. The composition of claim 1 comprising 30–400 parts by weight of polynorbornene plasticizer per 100 parts by weight of polynorbornene.

3. The composition of claim 2 comprising about 90–10 parts by weight of polyolefin resin and correspondingly about 10–90 parts by weight of polynorbornene.

4. The composition of claim 3 comprising about 75–10 parts by weight of polyolefin resin and correspondingly about 25–90 parts by weight of polynorbornene which composition is elastomeric.

5. The composition of claim 3 in which the polynorbornene is cross-linked.

6. The composition of claim 3 in which the polyolefin resin is polyethylene.

7. The composition of claim 3 in which the polyolefin resin is polypropylene.

8. A thermoplastic composition comprising a blend of about 10 to about 90 parts by weight of thermoplastic crystalline polyolefin resin, about 90 to about 10 parts by weight of cross-linked polynorbornene per 100 total parts by weight of polyolefin resin and polynorbornene, and sufficient plasticizer to lower the glass transition temperature of the polynorbornene to within the rubbery range, in which the cross-linked plasticized polynorbornene is in the form of small dispersed particles of such a size that the composition is processable as a thermoplastic.

9. The composition of claim 8 in which the polyolefin resin is polyethylene or polypropylene.

10. The composition of claim 9 in which the particle size is 50 microns number average or less.

11. The composition of claim 10 in which the particle size is 10 microns number average or less.

12. The composition of claim 11 in which the polynorbornene is cross-linked to the extent that no more than twenty weight percent of it is extractable in a solvent in which noncross-linked polynorbornene is essentially completely soluble.

13. The composition of claim 12 comprising about 20 to about 60 parts by weight of polyolefin resin and about 80 to about 40 parts by weight of polynorbornene.

14. The composition of claim 13 containing 30–400 parts by weight of polynorbornene plasticizer per 100 parts by weight of polynorbornene.

15. The composition of claim 14 in which the polyolefin resin is polyethylene.

16. The composition of claim 14 in which the polyolefin resin is polypropylene

17. The composition of claim 16 containing 50–200 parts by weight of polynorbornene plasticizer per 100 parts by weight of polynorbornene.

18. The composition of claim 17 in which the polynorbornene plasticizer is aromatic or naphthenic extender oil.

19. An elastoplastic composition comprising a blend of about 75 to 10 parts by weight of thermoplastic crystalline polyolefin resin, about 25 to 90 parts by weight of cross-linked polynorbornene per 100 total parts by weight of polyolefin resin and polynorbornene, and sufficient plasticizer to lower the glass transition temperature of the polynorbornene to within the rubbery range, in which the cross-linked plasticized polynorbornene is in the form of dispersed particles of a size of 50 microns number average or less, which composition is elastomeric and processable as a thermoplastic.

20. The composition of claim 19 comprising a blend of about 20 to about 60 parts by weight of polyolefin resin, about 80 to about 40 parts by weight of polynorbornene per 100 total parts by weight of polyolefin resin and polynorbornene and 30 to 400 parts by weight of polynorbornene plasticizer per 100 parts by weight of polynorbornene.

21. The composition of claim 20 in which the polyolefin resin is polyethylene or polypropylene.

22. The composition of claim 21 containing 50 to 200 parts by weight of polynorbornene plasticizer per 100 parts by weight of polynorbornene.

23. The composition of claim 22 in which the polynorbornene is cross-linked to the extent that no more than ten weight percent of it is extractable in a solvent in which noncross-linked polynorbornene is essentially completely soluble.

24. The composition of claim 23 in which the polynorbornene plasticizer is aromatic or naphthenic extender oil.

25. The composition of claim 24 in which the size of the dispersed cross-linked polynorbornene particles is between 0.1–2 microns number average.

26. The composition of claim 25 in which the polyolefin resin is polyethylene.

27. The composition of claim 25 in which the polyolefin resin is polypropylene.

28. The composition of claim 26 prepared by masticating the blend with rubber curative at cross-linking temperature until the polynorbornene is cross-linked.

29. The composition of claim 27 prepared by masticating the blend with rubber curative at cross-linking temperature until the polynorbornene is cross-linked.

30. A process for making a homogenous polymer blend which comprises first masticating a blend of about 10 to about 90 parts by weight of thermoplastic crystalline polyolefin resin, about 90 to about 10 parts by weight of polynorbornene per 100 total parts by weight of polyolefin resin and polynorbornene, and sufficient plasticizer to lower the glass transition temperature of the polynorbornene to within the rubbery range, at a temperature and for a time sufficient to melt the polyolefin resin, next masticating the mixture at a temperature below the melting temperature of the polyolefin resin, and lastly masticating the mixture at a temperature above the melting temperature of the polyolefin resin.

31. The process of claim 30 in which the mixture comprises 30–400 parts by weight of polynorbornene plasticizer per 100 parts by weight of polynorbornene.

32. The process of claim 31 in which the mastication time of any of the three mastication steps is between about 0.5 to 10 minutes.

33. The process of claim 32 which comprises cross-linking the polynorbornene during the last mastication step.

34. The composition of claim 2 comprising about 20–150 parts by weight particulate filler per 100 parts by weight of polynorbornene.

35. The composition of claim 14 comprising about 20–150 parts by weight particulate filler per 100 parts by weight of polynorbornene.

36. The composition of claim 20 comprising about 20–150 parts by weight particulate filler per 100 parts by weight of polynorbornene.

* * * * *